United States Patent

Vanden Broek et al.

[11] 3,902,813
[45] Sept. 2, 1975

[54] AUTOMATIC GAIN ADJUSTMENT FOR SCANNING DENSITOMETER OUTPUT DEVICE

[75] Inventors: Jan A. Vanden Broek, Ann Arbor; William L. Wilfong, Whitmore Lake, both of Mich.

[73] Assignee: Transidyne General Corporation, Ann Arbor, Mich.

[22] Filed: Mar. 18, 1974

[21] Appl. No.: 451,732

[52] U.S. Cl. .............. 356/201; 250/559; 346/33 A; 356/203
[51] Int. Cl. .......................................... G01n 21/22
[58] Field of Search.................... 356/201, 202, 203; 250/559, 572; 346/33 A

[56] References Cited
UNITED STATES PATENTS
3,614,241  10/1971  Sanford et al. ..................... 356/203

Primary Examiner—Vincent P. McGraw
Attorney, Agent, or Firm—Krass & Young

[57] ABSTRACT

A densitometer is operative to scan a sample to provide an output voltage proportional to the instantaneous density of the sample. During a first scan of the sample this output is provided to a peak voltage detector so that at the end of the first scan the peak detector contains a voltage proportional to the peak density of the sample. This voltage is applied to an input of a variable gain element so as to adjust the gain to a level which is inversely proportional to the peak voltage. During a second scan, the densitometer output is provided to the gain control element and the output of the element drives a chart recorder. The peak signal recorded during this second scan is thereby adjusted to the maximum scale value of the recorder.

6 Claims, 6 Drawing Figures

' 3,902,813

AUTOMATIC GAIN ADJUSTMENT FOR SCANNING DENSITOMETER OUTPUT DEVICE

BACKGROUND OF THE INVENTION

1. Field of the Invention

This invention relates to an electronic system for adjusting the output of a scanning densitometer to a level which will produce full scale deflection on a display device in response to the maximum output of the densitometer during the scan of a given sample.

2. Prior Art

In a number of analytic processes it is necessary to obtain a graphic plot of variations in density, or radiation transmittance of an elongated sample as a function of positions along the length of the sample. For example, the relative quantities of various protein components in a blood sample is placed on a media and subjected to an electric field. The protein components of the blood migrate in the direction of the field at rates proportional to their molecular weights producing a separation record of varying density along the direction of the field. To determine the relative quantitative levels of each blood fraction this separation is scanned using a light source on one side of the record and a photo-detector on the other side. The output signal from the scanning densitometer is typically provided to a chart recorder for later analysis or may be provided directly to another form of display device such as a cathode ray tube. In the recording or display process it is desirable that the density trace have as large an amplitude as possible, with a peak density value of the sample generating, as near as practical, the maximum deflection of the recording pen, cathode ray beam or the like. In certain types of analysis it is also useful to know the peak values of various components of the trace relative to one another. If the largest peak value can be set equal to the full scale deflection on the output device, a record grid may be used wherein full scale deflection represents 100% and the percentages of the other peaks may be directly read off of a grid in terms of their percentages of this maximum peak.

Since each sample will have a different density range, previous practice has been to provide a manually adjustable gain element in the signal conditioning circuitry between the densitometer output and the recording or display input. The operator may adjust the gain on a trial and error basis or may position what appears to be the densest area of the record under the scanning head and adjust the gain so that the maximum output deflection occurs at that point. This manual operation is time consuming and seldom results in an adjustment which produces exactly full scale output at the peak of the maximum density signal.

It is an object of the present invention to provide an automatic system for adjusting the gain of the signal processing circuit for a densitometer so that a recording or display device which receives the compensated signal will display the largest peak in the signal at the maximum level of the output device. Moreover, it is a further object to provide such circuitry which is easy to use and simple in construction so as to be low in initial cost and reliable in operation.

SUMMARY OF THE INVENTION

The present invention broadly takes the form of means for receiving the output signal of a densitometer during an initial scan of a sample and for generating a signal, based on that analysis, which can be used to adjust the gain of an electrically adjustable variable gain element which processes the densitometer output signal, so that during a subsequent scan of the sample the peak output of the variable gain element causes a full scale deflection on an associated output display. More specifically, the present invention employs a peak voltage detect and hold circuit which receives the densitometer output during the initial scan of the sample and later provides its output to one input of a variable gain circuit which has a gain inversely proportional to the voltage applied to that input. Thus, when the sample has a relatively high peak density the gain will be adjusted to a relatively low value, and vice versa.

In a first embodiment of the invention which employs an element providing a gain that is a reasonably linear function of the voltage at its input, the densitometer signal is provided directly to the voltage peak detector during the initial scan. During a subsequent scan the peak detector output is provided directly to an input of the variable element.

In this embodiment the adjustable gain element might either be an electronic divider device or the reference potentiometer of a servo-recorder.

An alternative embodiment of the invention uses a lower cost variable gain circuit which provides a non-linear gain with respect to the voltage at its input. During the initial scan the densitometer output is provided to the variable gain circuit and the output of the circuit is provided as one input to an operational amplifier comparator having a reference input equal to the desired maximum recorder deflection. The amplifier output is provided to the peak detector and the output of the peak detector is provided to the gain control input of the variable element. Thus, the peak detector and the variable gain element are in the feed-back path of the operational amplifier and the voltage at the output of the variable gain element is forced to assume a voltage equal to the reference. When the densitometer output reaches its highest peak, the voltage applied to the peak detector will also reach a maximum and the maximum will be stored by the peak detector. During the subsequent scan, the output of the variable gain circuit is provided to the recorder and the peak detector maintains the gain of the circuit at a value which causes maximum deflection on the recorder when the maximum value of the densitometer signal occurs.

Other objectives, advantages and applications of the present invention will become apparent by the following detailed description of several preferred embodiments of the invention. The description makes reference to the accompanying drawings in which.

Figure 1:
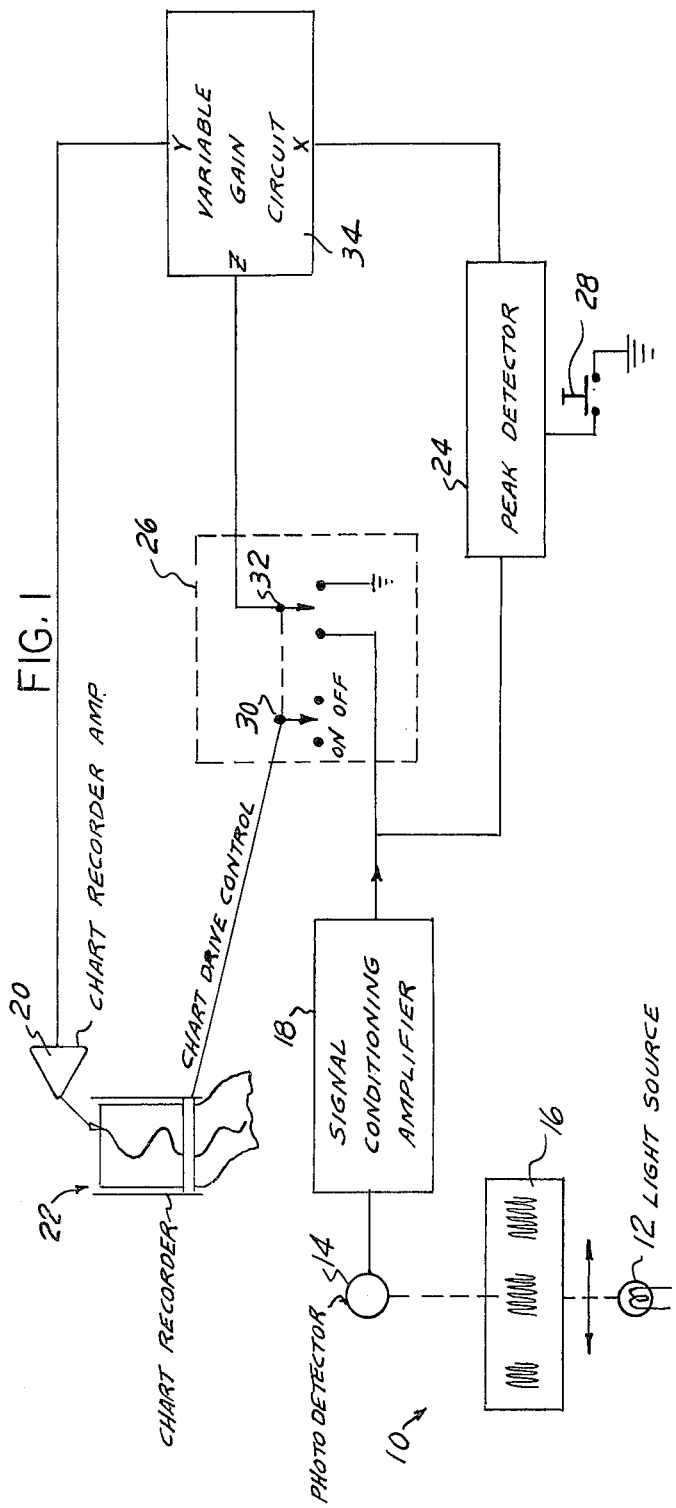
FIG. 1 is a schematic diagram of a system for recording the output of a scanning densitometer employing the automatic gain adjusting system of the present invention.

Referring to FIG. 1, a scanning densitometer 10 consists of a light source 12 and a photodetector 14 disposed on opposite sides of a density sample 16, and suitable means for transporting the sample longitudinally relative to the light and detector so that the detector 14 provides an output proportional to the density of the record at each point in the scan. A typical densitometer will employ a reversible transport mechanism so that a sample can be scanned first in one direction and then in the opposite direction. Other forms of radiant energy, such as infared radiation, could alternatively be used as the scanning radiation.

The output of the photodetector 14 is passed through a signal conditioning amplifier 18 of the conventional type. In prior art systems the gain of this amplifier might be manually controllable and its output would be applied directly to the input amplifier 20 of a chart recroder generally indicated at 22. The chart recorder is typically a pen type although the invention is equally applicable to other forms of recorders, as well as non-recording display devices such as cathode ray tubes.

In the preferred embodiment of the invention, rather then being applied directly to a chart recorder 22, the output of the signal conditioning amplifier 18 is applied to a peak voltage detector 24 and to a switching circuit 26. The peak detector may be of the conventional type employing a capacitor and an operational amplifier to store the highest voltage provided to it. It is equipped with a manual reset button 28 which grounds the detector so as to discharge the capacitor before the initial scanning operation.

The switching circuit 26 includes a pair of ganged single pole-double throw switches 30 and 32. The switch 30 constitutes an on-off switch for the chart recorder drive motor. Switch 32 connects an input of a variable gain circuit 34, either to the output of the signal conditioning amplifier 18 or to ground.

The output of the variable gain circuit 34 is provided to the chart recorder amplifier 20. The dividing input of the variable gain circuit is connected to the output of the peak detector 24.

The variable gain circuit 34 is of the dividing type. Considering the input from the switch 32 as the Z input, the output to the chart recording amplifier as the Y output, and the gain input from the peak detector 24 as the X input, the function of the gain circuit is $Y = K Z/X$, where K is a constant. The gain of the circuit is thus inversely proportional to the voltage applied by the peak detector circuit 24 to the X input. The circuit must have a gain which is generally linear with respect to this input in order to properly operate.

In operation, the system of FIG. 1 is initially adjusted by placing the ganged switches 26 to their position wherein the chart drive is off and the input to the variable gain circuit 34 is grounded. The stored value of the peak detector is zeroed by momentarily depressing the button 28. The density sample is then scanned in a first direction. During this scan the output of the amplifier 18 is provided to the peak detector 24 and the detector stores the highest output of the amplifier during this scan. This voltage is applied to the X input of the vari-able gain circuit 34 and adjusts the gain of the circuit in inverse proportionality to this peak voltage.

The switches 26 are then thrown to start the chart drive motor and to provide the output of the signal conditioning amplifier to the Z input of the variable gain circuit. The sample 16 is then scanned in the reverse direction and the output of the variable gain circuit is applied to the chart recorder amplifier 20. Since the peak voltage applied to the Z input of the variable gain circuit during the second scan is equal to the voltage stored in the detector 24 by virtue of it being charged by the first scan, the peak value of the Y output of the gain circuit, occuring at this instant, will be equal to the scale factor K of the variable gain circuit. This scale factor is chosen such as to provide full-scale deflection of the chart recorder pen or an input voltage of K to the chart recorder amplifier 20. As has been noted, the chart paper may be provided with divisions which allow the height of the secondary peaks to be interpreted as percentages of the height of the highest peak.

Figure 2:
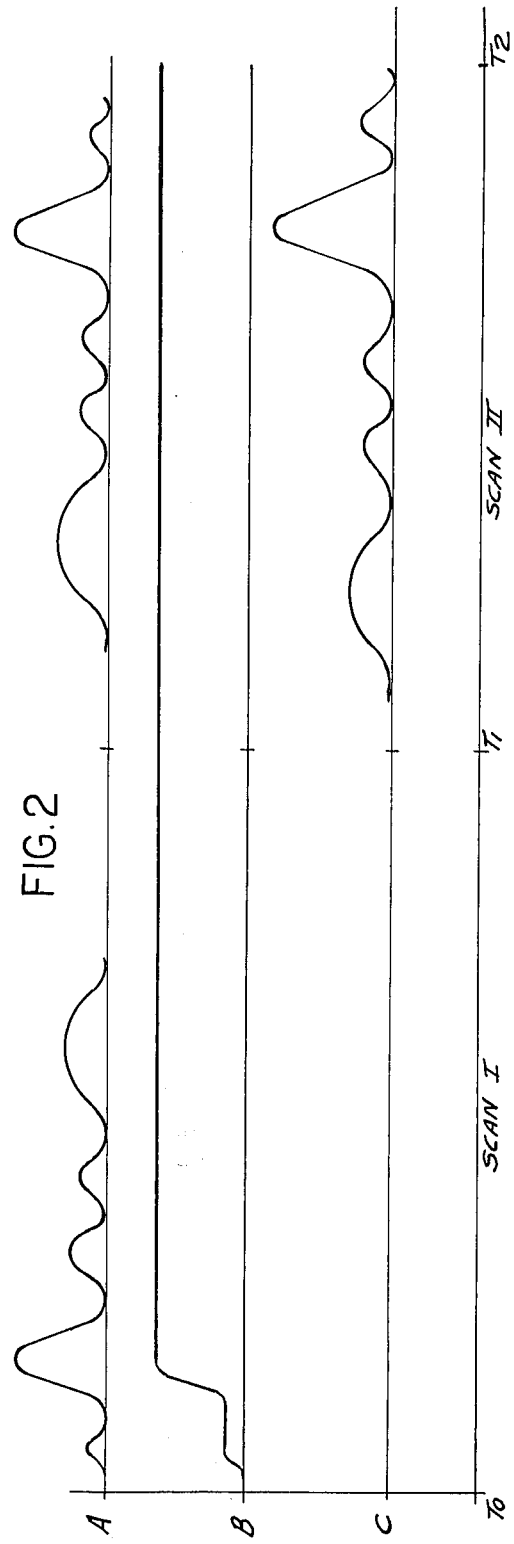
FIG. 2 is a chart showing wave forms at various points in the system during an initial adjusting scan of the apparatus of FIG. 1 and a subsequent recording scan.

The waveforms of FIG. 2 illustrate the operation of the device. FIG. 2a represents the output of the scanning densitometer during the initial scan extending from $T_0$ to $T_1$ and then during the second scan extending from $T_1$ to $T_2$. FIG. 2b represents the voltage at the output of the peak detector 24 during these two scans. During the initial scan, it rises until the highest peak of the initial scan is reached. It then maintains that voltage during the balance of the second scan. FIG. 2c represents the voltage at the output of the variable gain circuit, and also the voltage recorded on the chart. During the first scan since no input is applied to the variable gain circuit 24, it has no output. During the second scan the output of the variable gain circuit follows the output of the scanning densitometer as multiplied by the adjusted gain. This gain adjustment is such that when the peak densitometer output occurs the output of the variable gain circuit has a magnitude causing full deflection of the recorder pen 22.

Figure 3:
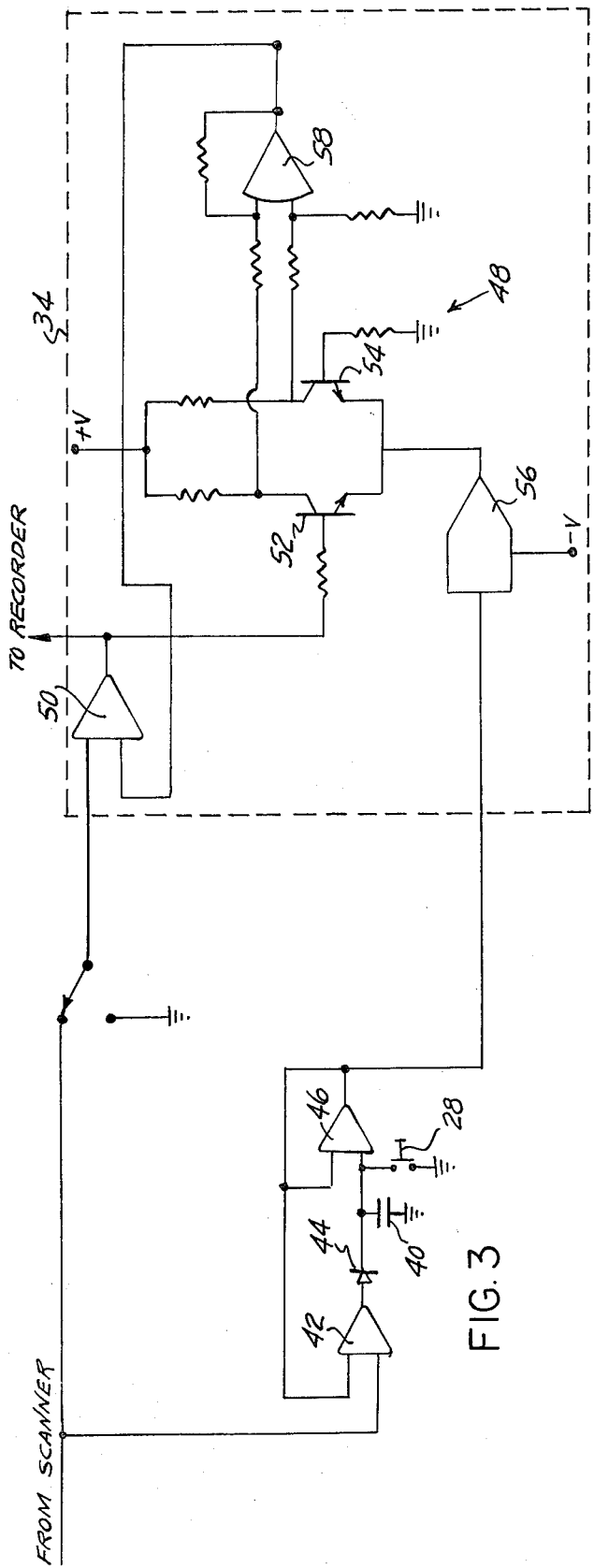
FIG. 3 is a more detailed schematic diagram of the peak detector and variable gain circuit used with the system of FIG. 1.

FIG. 3 illustrates the circuitry of the peak detector 24 and the variable gain circuit 34 in greater detail than FIG. 1. The peak detector 24 essentially consists of a charging circuit for a capacitor 40. The capacitor is charged by the output of a first input operational amplifier 42 feeding through a diode 44. A second output operational amplifier 46 has one input provided from the capacitor and its other input connected to its output feedback arangement so as to provide a voltage output equal to the voltage in the capacitor without drawing any current from the capacitor.

The variable gain circuit 34 utilizes a transconductance multiplier, generally indicated at 48, connected to an operational amplifier 50 so as to create a dividing circuit. The transconductance multiplier may be of the type described at pages 275–277 of Operational Amplifier Design and Application, McGraw-Hill, New York, 1971. The multiplier employs a matched pair of transistors 52 and 54 having their emitters connected together to supply current to a voltage to current convertor 56 which is fed by the output of the peak detector 24. The base of the transistor 54 is grounded and the base of the transistor 54 represents the other multiplier input and is fed by the output of the operational amplifier 50. The voltage differential across the collectors of the two transistors is proportional to the product of these input voltages. An operational amplifier 58 provides proper scaling to these voltages and conversion to a single ended output, which is applied as one input to the operational amplifier 50.

The scanning densitometer output is provided as the other input the the operational amplifier 50 during the second scan, via switch 32. Since the multiplier is connected in the feed-back path of the operational amplifier 50 during the second scan the output of the operational amplifier is forced to equal the peak detector voltage. The output of the operational amplifier, which is provided to the recorder, is directly proportional to the densitometer output and inversely proportional to the peak voltage detector output.

Figure 4:
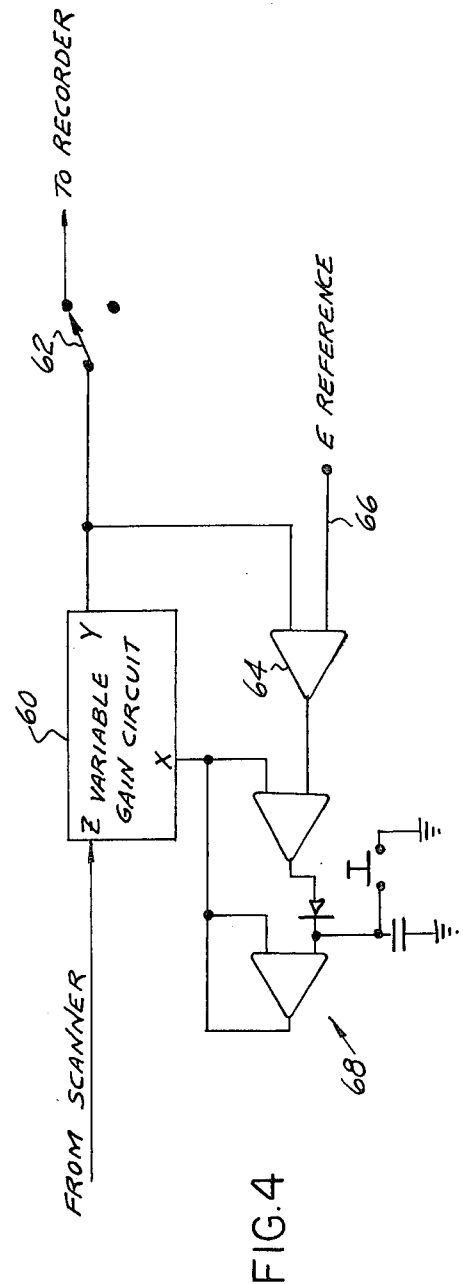
FIG. 4 is a schematic diagram of an alternative form of gain adjusting system useful with variable gain circuits which have a gain which is non-linear with respect to their dividing inputs.

The circuit of FIG. 3 depends on a fair linearity existing between the peak detector voltage and the gain of the variable gain circuit. FIG. 4 discloses an alternative circuit which may employ a variable gain element with a nonlinear relation between the gain of the circuit and its input. In this circuit the scanner output is permanently connected to an input of the variable gain circuit 60. The output of the variable gain circuit is applied to a single pole-double throw switch 62 so that during the second scan the output is provided to a suitable recorder but during the first scan this connection is opened. The output of the variable gain circuit 60 is also provided to an operational amplifier 64, connected in a comparator mode, along with a reference voltage on line 66, equal to the voltage which produces the desired maximum deflection of the recorder.

A peak detector circuit generally indicated at 68, substantially identical to the peak detector illustrated in FIG. 3, is connected between the output of the comparator 64 and the gain adjusting input of the variable gain circuit 60. The variable gain circuit divides the input from the scanner by a non-linear function of the voltage from the peak detector to provide the output voltage. During the initial scan, when the scan voltage reaches a peak, the feed-back circuit for the operational amplifier 64, through the peak detector 68 and the variable circuit 60, forces the output of the variable gain circuit to equal the reference voltage. At this time the peak detector 68 assumes a voltage which adjusts the gain of the circuit 60 during the second scan to cause the output to the recorder to equal the reference voltage when the scan signal again reaches its peak.

Figure 5:
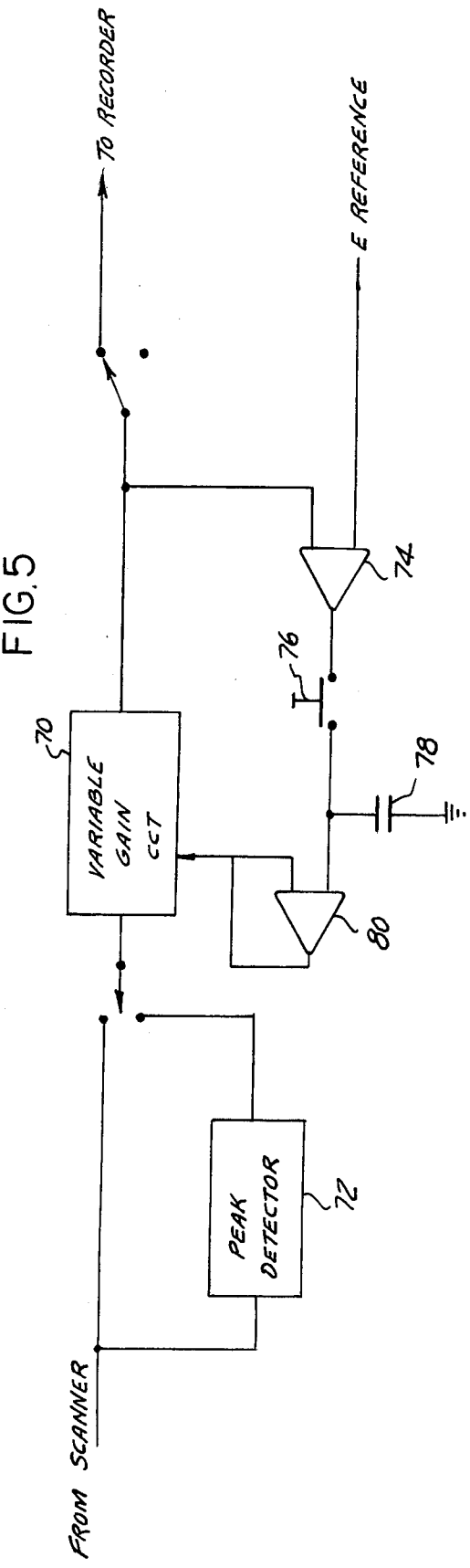
FIG. 5 is a schematic diagram of another alternative embodiment of a gain adjusting system.

One of the difficulties encountered with the use of the circuitry of FIG. 4 is the possibility of the variable gain circuit being unable to track short duration peak voltages from the scanner due to its internal time constant. In order to obviate that difficulty the circuit of FIG. 5 provides the scanner voltage to the variable gain circuit 70 through a peak detector 72 during the first scan. The variable gain circuit is disposed in the feedback path of an operation amplifier 74 having a reference voltage as its comparator input. A momentary contact switch 76 connects the output of the operational amplifier 74 to a sample and hold circuit consisting of a grounded capacitor 78 and a buffering operational amplifier 80. The output of the amplifier 80 is connected to the input of the variable gain circuit 70.

At the end of the first scan the peak detector 72 has assumed a voltage equal to the peak encountered during the scan. At that time the momentary contact switch 76 is closed for a sufficient period of time for the feed-back loop to settle down, causing the output of the variable gain circuit to assume a voltage equal to the reference voltage and charging the peak detector. During the second scan the output of the scanner is provided directly to the variable gain circuit which has its gain adjusted by the voltage on the capacitor in the sample and hold circuit. Accordingly the peak output to the recorder during the second scan is equal to the reference voltage.

Figure 6:
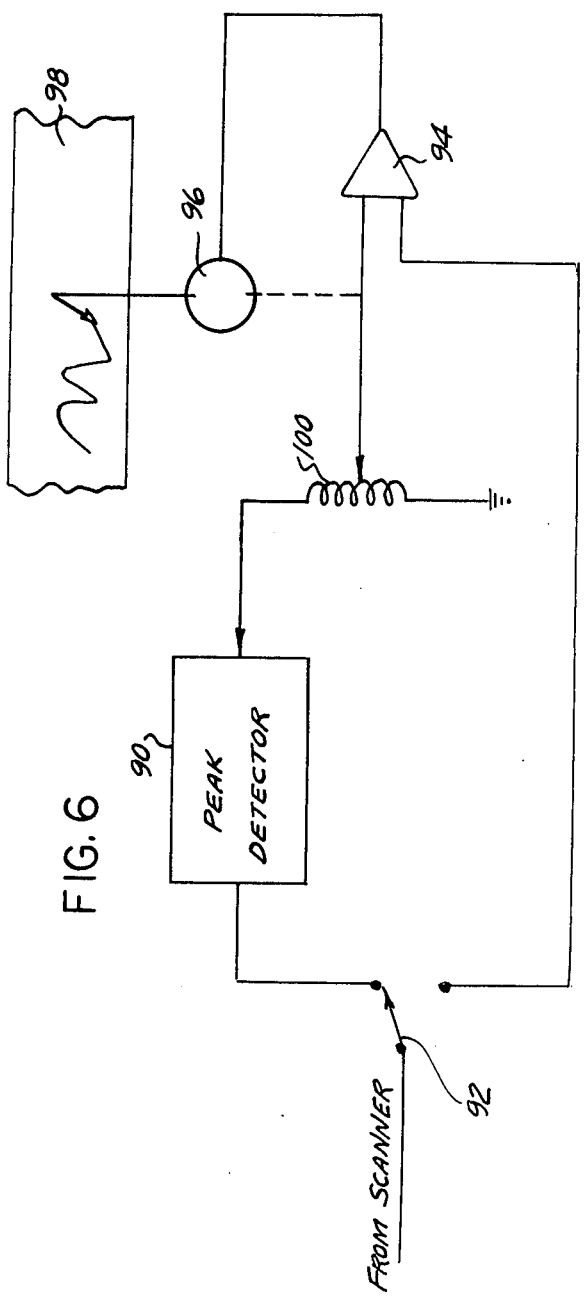
FIG. 6 is a schematic diagram of an alternative gain adjusting system wherein the peak detecting voltage is used as exitation for a servo-recorder reference potentiometer.

FIG. 6 illustrates a further variation on the invention wherein the recorder employs a potentiometer servo-drive and that potentiometer is employed as the variable gain element. During the first scan the scanner output is provided to a peak detector 90. During the second scan a switch 92 connects the scanner output to an operational amplifier 94, connected at a comparator mode, and having its output connected to a pen drive motor 96 and a chart recorder 98. The drive motor 96 also controls the position of the variable arm of the potentiometer 100 which applies the voltage to the other input of the comparator amplifier 94. During the second scan the reference voltage for the potentiometer 100 is derived from the peak detector 90. Accordingly the scale of operation of the recorder pen is adjusted as a function of the peak voltage.

The embodiments of the invention in which an exclusive property or privilege is claimed are defined as follows:

1. A system for receiving the output of a scanning densitometer and providing a signal to a display device comprising: a variable gain element; a peak voltage detector having its output connected to an input of a variable gain element so as to control the gain of the element; and switch means operative to connect the output of the densitometer to the peak detector during a first scan of a density record and to connect the output of the densitometer to an input of the variable gain element during a second scan, whereby during the first scan the peak detector assumes a voltage which will cause the variable gain element to output a signal causing the display to generate a full deflection signal at such time as the densitometer signal reached its maximum during a second scan of the same density record.

2. The system of claim 1 wherein during the first scan the densitometer output is connected to the peak detector through a circuit which includes the variable gain element so that the peak detector is charged to a voltage which causes the output of the variable gain element to assume a value which will cause a full deflection of the display unit at occurrence of the peak of the densitometer signal during the second scan, independent of non-linearities in the gain of the variable gain element as a function of its input from the peak detector.

3. The system of claim 1 wherein the output of the densitometer is directly connected to the peak detector during the first scan.

4. The system of claim 1 wherein the variable gain element has an output which is inversely proportional to its input from the peak detector.

5. The system of claim 1 wherein the variable gain element constitutes a transconductance multiplier connected in the feedback path of an operational amplifier so that its gain is inversely proportional to a function of the signal on its input from the peak detector.

6. The system of claim 1 wherein the switch means operates to connect the peak detector in series with the variable gain element in the feedback loop of an operational amplifier, the operational amplifier having a reference input equal to the desired maximum output of the variable gain circuit.

* * * * *